United States Patent
Huppmann et al.

Patent Number: 5,856,034
Date of Patent: Jan. 5, 1999

[54] METHOD AND DEVICE FOR OPERATING A FUEL CELL SYSTEM

[75] Inventors: Gerhard Huppmann, Feldkirchen-Westerham; Peter Kraus, Baldham, both of Germany

[73] Assignee: MTU Mortoren-und Turbinen-Union, Germany

[21] Appl. No.: 765,808
[22] PCT Filed: May 20, 1995
[86] PCT No.: PCT/EP95/01923
§ 371 Date: Apr. 8, 1997
§ 102(e) Date: Apr. 8, 1997
[87] PCT Pub. No.: WO96/02951
PCT Pub. Date: Feb. 1, 1996

[30] Foreign Application Priority Data

Jul. 16, 1994 [DE] Germany ............ 44 25 1866

[51] Int. Cl.⁶ ............................................. H01M 8/04
[52] U.S. Cl. ................................. 429/17; 429/20; 429/35
[58] Field of Search ........................ 429/17, 20, 35, 429/36

[56] References Cited

U.S. PATENT DOCUMENTS

| | | |
|---|---|---|
| 3,664,873 | 5/1972 | Buswell et al. |
| 3,718,506 | 2/1973 | Fischer et al. |
| 4,738,905 | 4/1988 | Collins ............................ 429/36 |
| 4,983,471 | 1/1991 | Reichner et al. ............ 429/20 X |
| 5,612,149 | 3/1997 | Hartvigsen et al. ........ 429/20 X |

FOREIGN PATENT DOCUMENTS

| | | |
|---|---|---|
| 398111 | 11/1990 | European Pat. Off. |
| 3333378 A1 | 4/1984 | Germany |
| 4339405 C1 | 1/1995 | Germany |
| 4425186 C1 | 3/1996 | Germany |
| 4-206362 | 7/1992 | Japan |
| 6-203859 | 7/1994 | Japan |
| 91/11034 | 7/1991 | WIPO |
| 94/29922 | 12/1994 | WIPO |

*Primary Examiner*—Stephen Kalafut
*Attorney, Agent, or Firm*—Evenson, McKeown, Edwards & Lenahan, P.L.L.C.

[57] ABSTRACT

The invention provides a method and apparatus for controlling gas circulation in a fuel cell system in which a stack of fuel cells is surrounded by a protective housing. According to the invention, used cathode gas and burnt combustion gas from the fuel cell stack directly into the interior of a protective housing which surrounds the fuel cell stack. A blower which is arranged inside the housing causes the used cathode gas to mix with the burnt combustion gas and recirculate to the cathode input of the fuel cell stack, where it is further with fresh gas from the exterior.

18 Claims, 3 Drawing Sheets

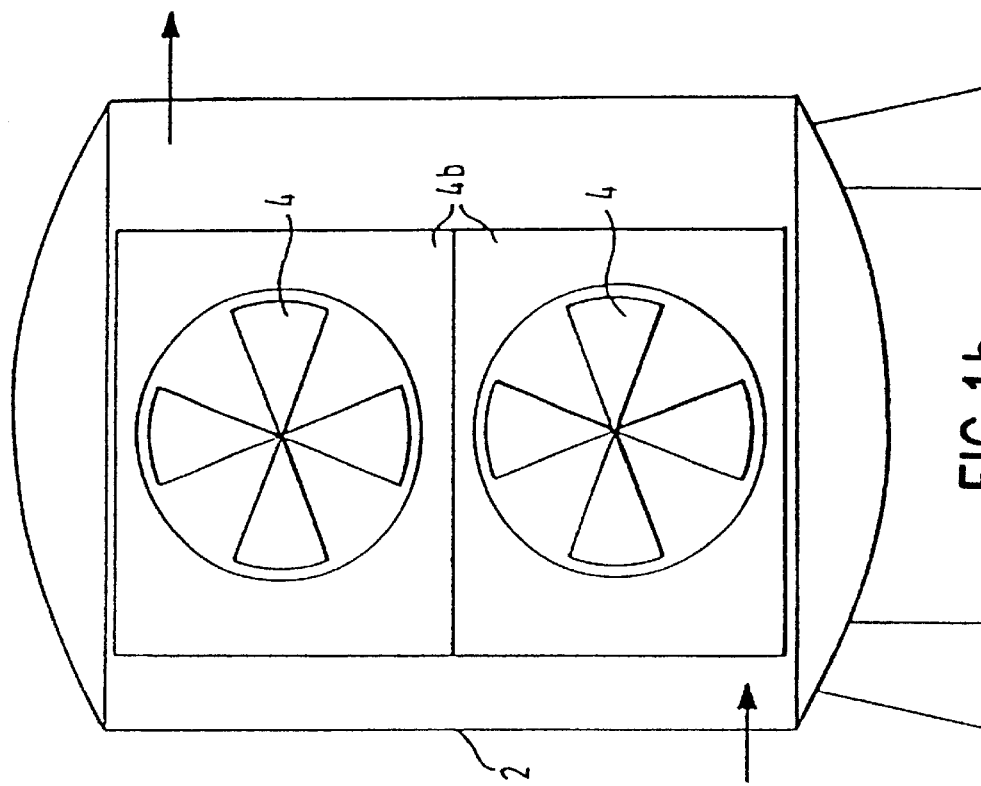
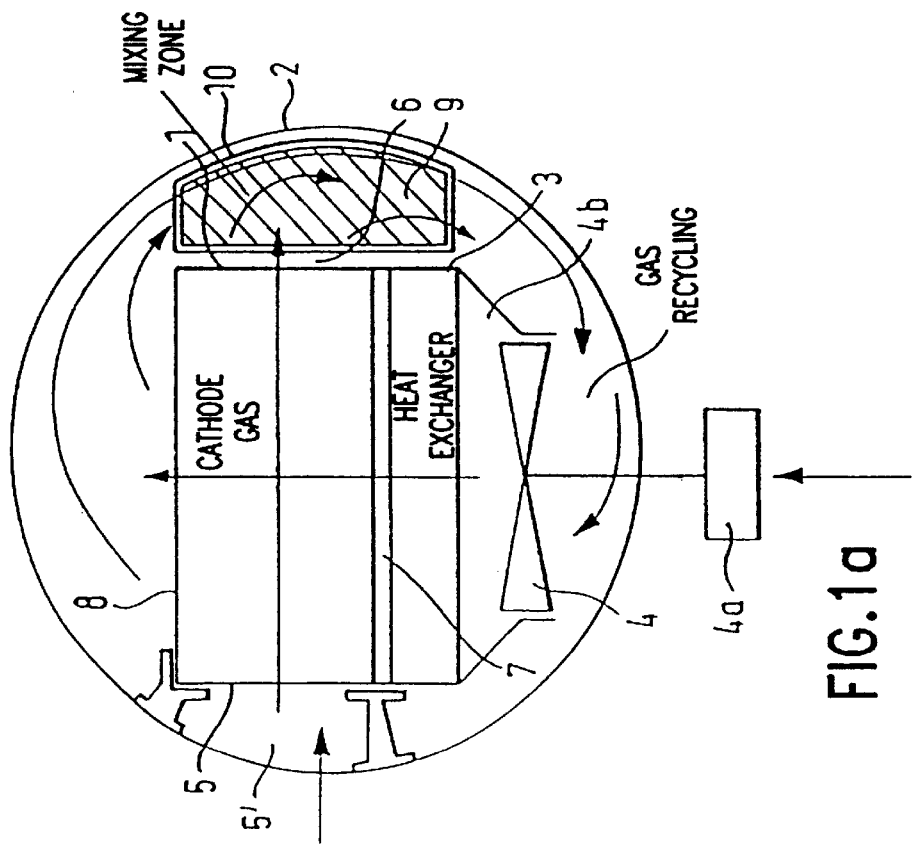
FIG. 1b
FIG. 1a

5,856,034

METHOD AND DEVICE FOR OPERATING A FUEL CELL SYSTEM

This is a National Stage Application of PCT/EP95/01923, filed May 20, 1995.

The present invention relates to a method and a device for operating a fuel cell system, especially a fuel cell system formed by fuel cells arranged in a stack and surrounded by a protective housing, with an anode input to supply combustion gas to the anodes of the fuel cells, an anode output to carry the burnt combustion gas away from the anodes, a cathode input for adding cathode gas to the cathodes of the fuel cells, and a cathode output to carry the used cathode gas away from the cathodes, with the combustion gas being supplied to the anode input through a combustion gas inlet device sealed off from the interior of the protective housing.

In fuel cell systems, a number of generally plate-shaped fuel cells are arranged in the form of a stack, each cell having channels running in a first direction for the combustion gas, and channels for the cathode gas arranged in a second direction, perpendicular to the first direction. The individual fuel cells in the stack are so arranged that an anode input for adding combustion gas to the respective anodes is provided on a first side of the fuel cell stack and an anode output for carrying away the burnt combustion gas from the anodes is provided on the side opposite the first side. A cathode input for supplying cathode gas to the cathodes of the fuel cell stack is provided on a second side of the fuel cell stack, and a cathode output for carrying away the used cathode gas from the cathodes is provided on the side opposite the second side. In high-temperature fuel cells, such as molten carbonate fuel cells (MCFC cells), there are problems with the gas-tight, electrically insulating design of supply lines and exhaust lines for the combustion gas and the cathode gas (manifolds) of the fuel cell stack, which are subjected to high operating temperatures as well as extreme temperature fluctuations during startup and shutdown of the fuel cell system. Gas supply and exhaust lines that are not tight could leak, posing the risk of explosion for example.

In fuel cell systems of the known type, gas distributors are provided as gas inlet devices and gas outlet devices for the combustion gas and the cathode gas to and from the inputs and outputs of the anodes and cathodes, respectively, either integrated into the cell stack (internal manifold) or mounted externally on the cell stack (external manifold). In fuel cell systems with external gas distributors, the latter are conventionally provided as hood-shaped gas inlet and gas outlet devices on the four sides of the fuel cell stack. The system thus formed is provided externally with heat insulation and installed completely within a protective housing. The connections of the gas distributors are guided in the form of pipes with equalizing bellows connected between them through the wall of the protective housing and connected to external units and assemblies. This involves a number of disadvantages. These include: complex guidance for the gas between the fuel cell system and the external assemblies and units, many interfaces and pipe connections, high flow resistances in the pipe connections, and a high cost for sealing and electrical insulation between the cell stack and the four gas hoods under the conditions of high temperatures and temperature changes, corresponding thermal deformations, and high DC current.

The goal of the present invention is to provide a method and a device for operating a fuel cell system of the species recited at the outset, in which the problems related to the sealing of the inputs and outputs of the anodes and cathodes of the fuel cell stack are largely avoided.

This goal is achieved according to the present invention by discharging both the used cathode gas and the burnt combustion gas from the fuel cell stack directly into the interior of a protective housing which surrounds the fuel cell stack. A blower which is arranged inside the housing causes the used cathode gas to mix with the burnt combustion gas and recirculate to the cathode input of the fuel cell stack, where it is further mixed with fresh gas from the exterior.

One important advantage of the present invention is that the cathode gas stream circulates freely inside the thermally insulated protective housing and the anode exhaust gas stream flows out freely into the protective housing. Thus, three of the four gas distributors that have to be sealed off from the fuel cell stack can be eliminated; only the gas distributor on the anode input side remains. Another advantage of the invention is that because of the free outward flow of the anode exhaust gas stream into the cathode gas stream circulating in the protective housing, harmful pressure differences between the combustion gas and the cathode gas can be avoided.

Further features and advantages of the present invention will be apparent from the following description of embodiments with reference to the figures.

BRIEF DESCRIPTION OF THE DRAWINGS

FIG. 1a is a cross sectional top view of an embodiment of a fuel cell system with a vertical arrangement of the fuel cell stack, in which the device and method according to the present invention are implemented;

FIG. 1b is a front view of the fuel cell system shown in FIG. 1a;

FIG. 2b is a front view of the system shown in FIG. 2a; and

DETAILED DESCRIPTION OF THE DRAWINGS

Figure 3:
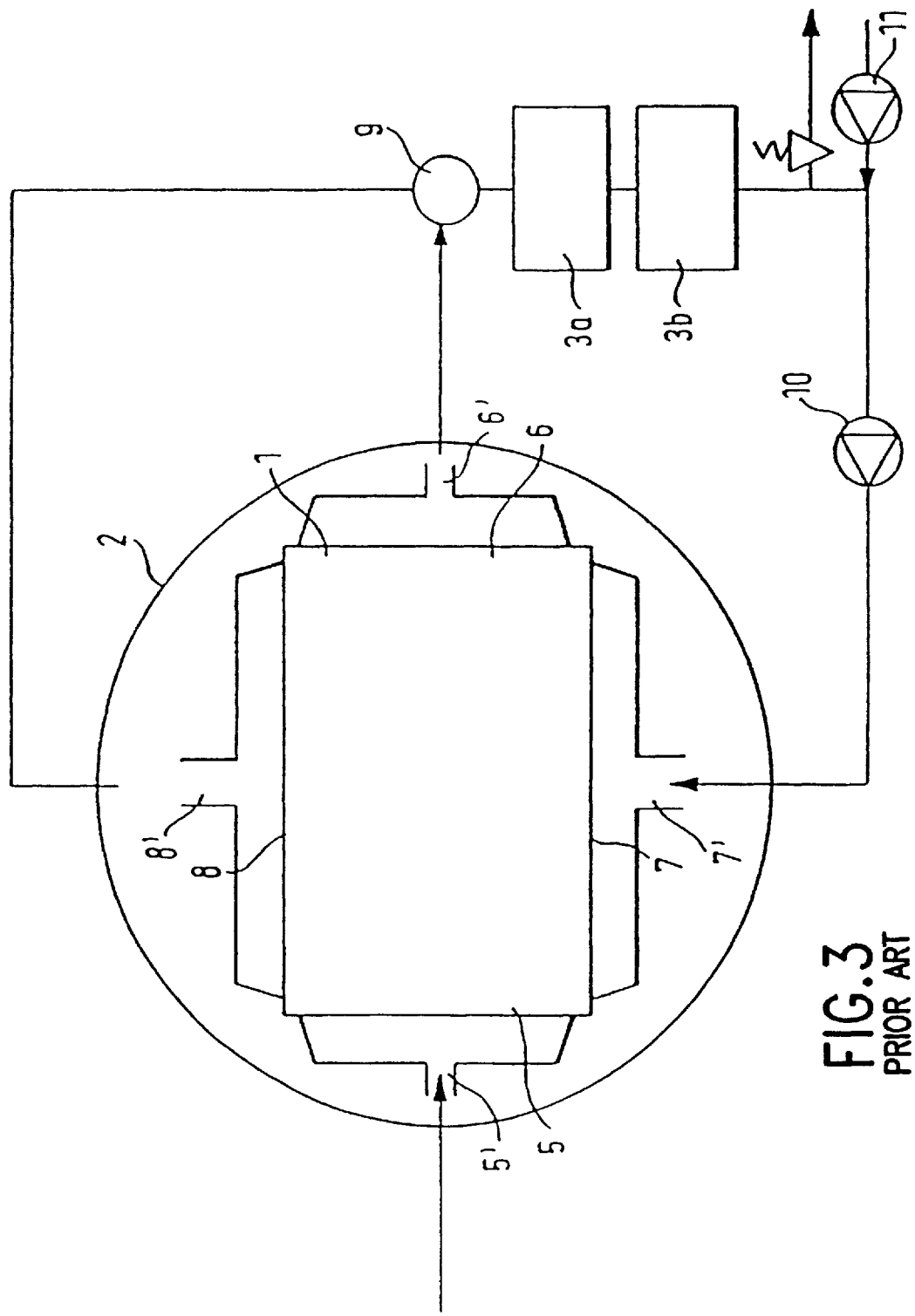
FIG. 3 is a cross sectional top view of a fuel cell system of conventional design.

FIG. 3 shows a conventional fuel cell system 1 formed by a stack of fuel cells surrounded by a protective housing 2. Fuel cell system 1 has an anode input 5 for supplying combustion gas to the anodes of the fuel cell stack on the left side of fuel cell system 1, an anode output 6 for carrying away the burnt combustion gas from the anodes on the right side of the fuel cell stack, a cathode input 7 for supplying cathode gas to the cathodes of the fuel cell stack on the front of the latter, as well as a cathode output 8 to carry away the used cathode gas from the cathodes on the back of the fuel cell stack. To supply and carry away the combustion gas and the cathode gas to and from the respective inputs and outputs of the anodes and cathodes, a combustion gas inlet hood 5' is placed over anode input 5, a combustion gas outlet hood 6' is placed over anode output 6, a cathode gas inlet hood 7' is placed over cathode input 7, and a cathode gas outlet hood 8' is placed over cathode output 8, each of which is sealed off from the fuel cell stack. The inlets and outlets to these gas inlet and gas outlet hoods are guided outward through protective housing 2 in a manner not shown in greater detail in FIG. 3 through equalizing bellows for compensating the lengthwise expansions caused by the temperature differentials.

The combustion gas is supplied to anode input 5 through the feed to combustion gas inlet hood 5' from a gas supply unit not shown in FIG. 3. The cathode gas is fed to the cathode input of a hot gas blower 10. The used cathode gas is carried away from cathode outlet 8 located opposite cathode inlet 7 and the burnt combustion gas carried away from anode outlet 6 located opposite anode inlet 5 is mixed as an anode exhaust gas with the used cathode gas in an anode gas mixer 9. The stream of cathode exhaust gas together with the added anode exhaust gas is first guided through a catalytic burner 3a and then a heat exchanger 3b to decouple the useful heat. The outlet of heat exchanger 3b is connected with the inlet of hot gas blower 10 so that the circuit for the cathode gas stream is completed. Downstream from heat exchanger 3b, the surplus cathode exhaust gas is removed from the cathode gas stream though an exhaust flap and replaced by fresh air supplied by a fresh air blower 11.

The gas inlet and gas outlet hoods 5', 6', 7', and 8' are each sealed off from the interior of protective housing 2. Each of these seals must be able to withstand the high temperatures and temperature changes that occur, while simultaneously providing electrical insulation from the high DC voltages that are applied to the fuel cells.

In the fuel cell system according to the invention shown in FIG. 1a, fuel cell stack 1 is in turn surrounded by a protective housing 2. At anode inlet 5, a combustion gas inlet device 5' is provided that is similar to gas inlet device 5' in the conventional fuel cell system shown in FIG. 3. The combustion gas supplied through protective housing 5 is fed to the anode input of the fuel cells by this combustion gas inlet device 5'. In contrast to the arrangement in the conventional system, however, anode outlet 6 of the fuel cell stack opens to discharge the burnt combustion gas and cathode outlet 8 of the fuel cell stack opens to discharge the used cathode gas into the interior of protective housing 2. Inside protective housing 2, a blower device 4 is also provided by which the cathode gas is caused to circulate to bring it back to cathode input 7 of the fuel cell stack inside the protective housing. Since anode outlet 6 opens into the interior of protective housing 2, the burnt combustion gas is mixed with the cathode gas stream circulating inside protective housing 2. A portion of the gas mixture circulating inside protective housing 2 is replaced by fresh gas added from the outside that is added in the vicinity of cathode inlet 7 in a manner described in greater detail below.

According to the invention, therefore, the used cathode gas is discharged from cathode outlet 8 into the interior of protective housing 2 and caused to circulate to bring it back again to cathode inlet 7 inside the protective housing, with the burnt combustion gas being delivered from anode outlet 6 into the interior of the protective housing as well and being mixed with the cathode gas stream circulating therein, with a portion of said gas mixture circulating inside the protective housing being replaced by fresh gas added from outside. If necessary, a catalytic combustion unit 10 can be provided in mixing zone 9 for the anode exhaust gas and the cathode exhaust gas.

A heat exchanger 3 is located upstream of cathode inlet 7, said heat exchanger serving to decouple the useful heat from the circulating cathode gas stream. This heat exchanger 3 is coupled on its outlet side, sealed off from the interior of protective housing 2, with cathode inlet 7 of fuel cell stack 1. The surface of heat exchanger 3 that is exposed to the gas mixture circulating inside heat exchanger 2 can be provided with a catalytic coating by which the combustible residue of the anode gas added to the circulating cathode gas can be burnt catalytically.

Blower device 4, which can be formed for example by a conventional axial blower with an air scoop 4b, has a drive 4a located outside protective housing 2, said drive being coupled to blower device 4 (the blower rotor) by a drive shaft guided through protective housing 2. This drive shaft is designed so that the fresh gas is added through the drive shaft and the shaft and its bearing as well as blower device 4 are cooled thereby. With a suitable high-temperature-resistant design, the drive can also be located inside the protective housing. The surplus exhaust gas is removed from protective housing 2 through an overpressure flap not shown in the figure.

FIG. 1b is a front view of the fuel cell system shown in FIG. 1a, which shows that in this embodiment, a blower device 4 is formed by two axial blowers mounted one above the other, with the two axial blowers being coupled by the abovementioned air scoop 4b with the input side of heat exchanger 3.

Heat exchanger 3 is typically mounted, with interposition of insulating bushings (not shown) directly on the upper and lower end plates of fuel cell stack 1. The seal for the surrounding gap between the heat exchanger and the fuel cell stack can be provided for example by a loosely fitting soft seal, preferably a brush made of glass or ceramic fibers. Demanding requirements are not imposed on the tightness of this arrangement.

Figure 2B:
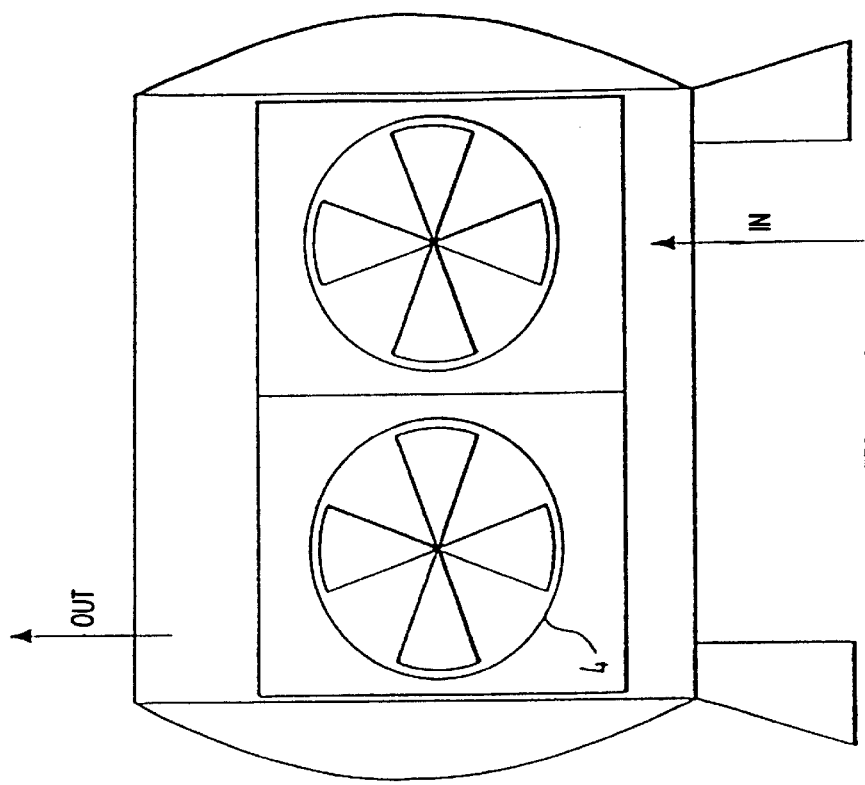
Figure 2A:
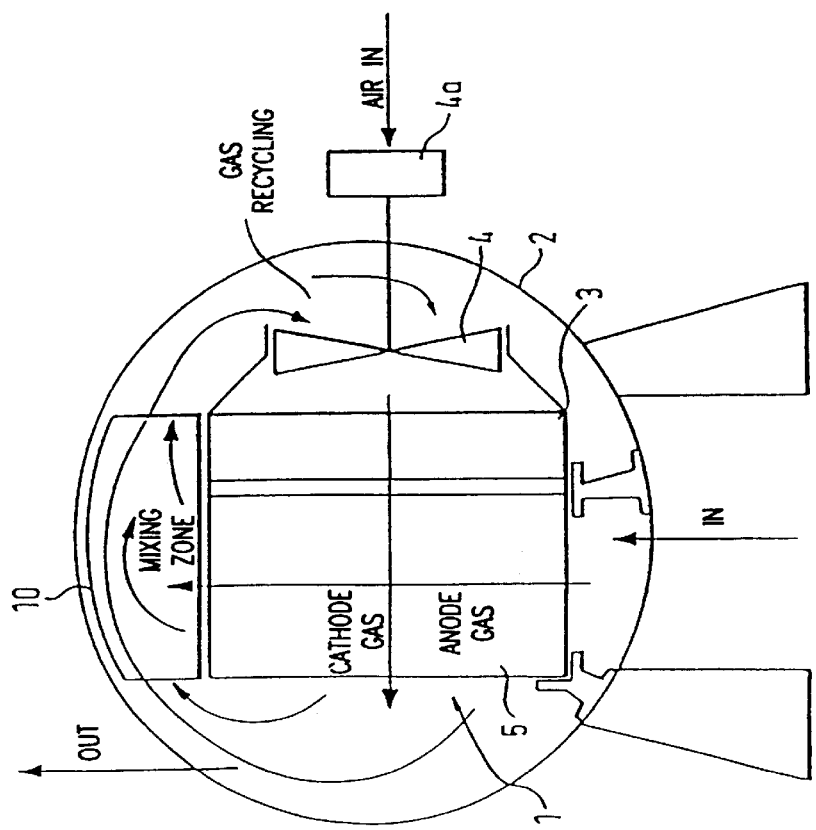
FIG. 2a shows a fuel cell system corresponding to FIG. 1 with a horizontal arrangement.

FIGS. 2a and 2b show a fuel cell arrangement which is similar to that of FIGS. 1a and 1b, except that the fuel cell is arranged horizontally. The structure and function of the embodiment of FIGS. 2a and 2b is otherwise the same as that of FIGS. 1a and 1b.

The present invention provides a fuel cell system in which three of the four gas inlet and gas outlet hoods and the corresponding electrically insulating seals can be eliminated. Because of the large circulation cross sections involved, and also the elimination of pipes, very low flow resistances develop, so that losses are minimal. With the good mixing of burnt anode gas and used cathode gas, accumulations of combustion gas that could result from leaks in the conventional design are impossible. Since only the anode inlet side is coupled to a gas inlet hood, large tolerances are acceptable on three sides of the fuel cell stack, so that mechanical fitting problems and displacements caused by deformation between the gas inlet and gas outlet hoods and the fuel cell stack are eliminated. Heat stresses are avoided by using the smallest possible temperature differentials in the system.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for operating a fuel cell system of the type in which fuel cells arranged in a stack are surrounded by a protective housing, with an anode inlet for supplying combustion gas to the anodes of the fuel cells, an anode outlet for carrying the burnt combustion gas away from the anodes, a cathode inlet for supplying cathode gas to the cathodes of the fuel cells, and a cathode outlet for carrying away the used cathode gas from the cathodes, with the combustion gas being supplied to anode inlet by a combustion gas inlet device which provides a seal with respect to the interior of the protective housing, said method comprising the steps of:

discharging used cathode gas from cathode outlet inside the protective housing;

causing said used cathode gas to circulate back to the cathode inlet in the interior of the protective housing;

discharging burnt combustion gas from anode outlet inside the protective housing;

mixing said burnt combustion gas with the cathode gas stream circulating inside protective housing;

and replacing a portion of the gas mixture circulating inside protective housing with fresh gas from outside said housing.

2. The method according to claim 1, wherein the fresh gas is added in the area of cathode inlet.

3. The method according to claim 1, wherein the cathode gas is caused to circulate by a blower device located inside protective housing.

4. The method according to claim 1, wherein the circulating cathode gas is fed through a heat exchanger to decouple useful heat.

5. The method according to claim 1, comprising the further step of guiding said circulating cathode gas through a catalytic combustion device to burn flammable residues of added anode gas.

6. The method according to claim 4, wherein catalytic combustion takes place in heat exchanger.

7. A gas circulation arrangement for a fuel cell system of the type in which fuel cells arranged in a stack are surrounded by a protective housing with an anode inlet for adding combustion gas to the anodes of the fuel cells, an anode outlet for carrying away the burnt combustion gas from the anodes, a cathode inlet for adding cathode gas to the cathodes of the fuel cells, and a cathode outlet for carrying away the used cathode gas from the cathodes, as well as with a combustion gas inlet device which provides a seal with respect to the interior of protective housing for supplying the combustion gas to anode inlet, said arrangement comprising:

a cathode outlet of the fuel cell stack which opens to discharge used cathode gas inside the protective housing;

a blower device provided inside the protective housing for causing the used cathode gas to circulate to the cathode inlet of the fuel cell stack inside protective housing;

an anode outlet of the fuel cell stack which opens to discharge burnt anode gas inside the protective housing, whereby the burnt anode gas is mixed with a used cathode gas stream circulating inside protective housing; and an air intake for replacing a portion of the gas mixture circulating inside the protective housing with fresh gas from the outside the housing.

8. The gas circulation arrangement according to claim 7, wherein a heat exchanger is provided inside the protective housing for decoupling useful heat from the circulating cathode gas stream.

9. The gas circulation arrangement according to claim 8, wherein the heat exchanger is located upstream from cathode inlet of the fuel cell stack.

10. The gas circulation arrangement according to claim 9, wherein a space between an outlet side of the heat exchanger and the cathode inlet is sealed off from an interior of protective housing.

11. The gas circulation arrangement according to claim 8, further comprising means for catalytic combustion of flammable residues of the anode gas added to the circulating cathode gas stream.

12. The gas circulation arrangement according to claim 11, wherein the means for catalytic combustion comprise a catalytic coating on a surface of heat exchanger that is exposed to the circulating gas mixture.

13. The gas circulation arrangement according to claim 7, wherein the blower device has a drive located outside protective housing, said drive being coupled with the blower device by a drive shaft guided through the protective housing, said shaft being designed so that fresh gas can be supplied through the drive shaft to cool it.

14. The gas circulation arrangement according to claim 7, wherein an overpressure flap is provided to discharge surplus exhaust gas from protective housing.

15. The gas circulation arrangement according to claim 8, wherein the heat exchanger is mounted on upper and lower end plates of the fuel cell stack.

16. The gas circulation arrangement according to claim 9, wherein a surrounding gap between the heat exchanger and the fuel cell stack is closed by a continuous seal.

17. The gas circulation arrangement according to claim 16, wherein the seal comprises fibers made from a material selected form the group consisting of glass and ceramic.

18. The gas circulation arrangement according to claim 16, wherein the seal comprises a brush.

* * * * *